US008539285B2

(12) United States Patent
Daily et al.

(10) Patent No.: US 8,539,285 B2
(45) Date of Patent: Sep. 17, 2013

(54) SYSTEMS FOR AGILE ERROR DETERMINATION AND REPORTING AND METHODS THEREOF

(75) Inventors: Thomas H. Daily, Pinetop, AZ (US);
Nikhil Khandelwal, Tucson, AZ (US);
Stefan Lehmann, Tucson, AZ (US);
Jason A. Ogroski, Tucson, AZ (US);
Ricardo S. Padilla, Tucson, AZ (US);
Kerri R. Shotwell, Tucson, AZ (US);
Benjamin S. Terris, Tucson, AZ (US);
Steve P. Wallace, Casa Grande, AZ (US); Richard A. Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 12/821,085

(22) Filed: Jun. 22, 2010

(65) Prior Publication Data

US 2011/0314339 A1    Dec. 22, 2011

(51) Int. Cl.
*G06F 11/00* (2006.01)

(52) U.S. Cl.
USPC ............................. 714/48; 714/26; 714/38.1

(58) Field of Classification Search
USPC ........................................... 714/26, 38.1, 48
See application file for complete search history.

(56) References Cited

U.S. PATENT DOCUMENTS

| | | | | |
|---|---|---|---|---|
| 6,006,016 A * | 12/1999 | Faigon et al. | ................... | 714/48 |
| 6,324,659 B1 | 11/2001 | Pierro | ............................ | 714/48 |
| 6,385,665 B1 * | 5/2002 | Canady et al. | ................... | 710/2 |
| 6,629,267 B1 * | 9/2003 | Glerum et al. | ............. | 714/38.11 |
| 6,823,482 B2 * | 11/2004 | Ahrens et al. | ................... | 714/57 |
| 7,039,833 B2 * | 5/2006 | Knuutila et al. | ............. | 714/38.1 |
| 7,287,193 B2 | 10/2007 | Ward | ............................. | 714/43 |
| 7,328,376 B2 * | 2/2008 | McGuire et al. | ................ | 714/48 |
| 7,434,099 B2 * | 10/2008 | Flynn et al. | ..................... | 714/26 |
| 7,613,949 B1 * | 11/2009 | Boone et al. | .................... | 714/25 |
| 7,634,690 B2 * | 12/2009 | Barsness et al. | .......... | 714/38.14 |
| 7,641,107 B1 * | 1/2010 | Gill et al. | ....................... | 235/379 |
| 7,757,126 B2 * | 7/2010 | Vidiyala | .................... | 714/38.14 |
| 7,774,454 B2 * | 8/2010 | Yamasaki et al. | ............ | 709/224 |
| 7,810,071 B2 * | 10/2010 | Thebes et al. | ................. | 717/124 |
| 7,895,470 B2 * | 2/2011 | Nastacio et al. | ............... | 714/25 |
| 7,895,471 B2 * | 2/2011 | Boone et al. | .................... | 714/25 |
| 7,904,756 B2 * | 3/2011 | Dilman et al. | ............... | 714/38.1 |
| 7,987,390 B2 * | 7/2011 | Chandrasekaran | ............ | 714/37 |
| 8,078,922 B2 * | 12/2011 | Yordanov et al. | ............... | 714/57 |
| 8,135,988 B2 * | 3/2012 | Ramacher et al. | ............. | 714/25 |
| 8,347,143 B2 * | 1/2013 | Atkins et al. | .................... | 714/26 |
| 2003/0061234 A1 * | 3/2003 | Ali et al. | .................... | 707/104.1 |
| 2006/0150009 A1 | 7/2006 | Takemori | ........................ | 714/12 |
| 2008/0282104 A1 * | 11/2008 | Khan | ............................... | 714/2 |
| 2008/0307266 A1 * | 12/2008 | Chandrasekaran | ............. | 714/38 |
| 2009/0210747 A1 | 8/2009 | Boone et al. | ..................... | 714/31 |
| 2010/0058122 A1 | 3/2010 | Compton et al. | ............... | 714/57 |
| 2010/0268981 A1 * | 10/2010 | Xiang | ............................... | 714/2 |

* cited by examiner

*Primary Examiner* — Joshua P Lottich
(74) *Attorney, Agent, or Firm* — Zilka-Kotab, PC

(57) ABSTRACT

According to one embodiment, a method for handling errors includes detecting that an error has occurred in a machine in a system, determining an error ID associated with the error, determining that the error should be reported to a host system for further analysis based on the error ID, determining that one or more actions should be taken by the system based on the error ID, and sending information corresponding to the error to the host system after it is determined that the error should be reported to the host system. In another embodiment, a system includes a processor and logic for performing the method. According to another embodiment, a computer program product includes a computer readable storage medium having computer readable code embodied therewith for performing the method. Other methods, systems, and computer program products are also described according to more embodiments.

20 Claims, 4 Drawing Sheets

SYSTEMS FOR AGILE ERROR DETERMINATION AND REPORTING AND METHODS THEREOF

BACKGROUND

As software development continues to become more agile, the ability to isolate errors, determine the severity of the errors, and report the errors has been driven to become equally agile. Allowing the system that controls the error processing and reporting to adjust with code updates allows the system to reduce warranty costs and improve reliability of the system. To illustrate this issue, the implementation of call home and error determination of IBM's scale out network attached storage (SONAS) is used throughout the descriptions. Of course, any desired system may be used that can determine and report errors. In a SONAS environment, the collection of multiple independent systems and software tools combine to make a scalable storage system. The challenge that arises from these types of configurations is how to develop an error determination tool to accurately and cohesively alert remote support of depending and fatal errors. Such a solution has heretofore been elusive.

SUMMARY

In one embodiment, a method for handling errors includes detecting that an error has occurred in a machine in a system, determining an error ID associated with the error, determining that the error should be reported to a host system for further analysis based on the error ID, determining that one or more actions should be taken by the system based on the error ID, and sending information corresponding to the error to the host system after it is determined that the error should be reported to the host system.

According to another embodiment, a system for handling errors includes a processor, logic for detecting that an error occurred in a machine in a system, logic for determining an error ID associated with the error, logic for determining that the error is a type that is reported to a host system for further analysis based on the error ID, logic for determining that additional actions should be taken by the system based on the error ID, and logic for sending information corresponding to the error to the host system after it is determined that the error is the type that is reported to the host system.

In another embodiment, a computer program product for handling errors includes a computer readable storage medium having computer readable program code embodied therewith. The computer readable program code includes computer readable program code configured to detect that an error occurred in a machine in a system; determine an error ID associated with the error, wherein each error ID is based on an error code set; and determine that the error should be reported to a host system for further analysis based on the error ID, which includes: computer readable program code configured to locate a command associated with the error ID in an error determination table which includes a plurality of error IDs each associated with either a command to send information corresponding to the error to the host system or a command not to send information corresponding to the error to the host system; follow the command associated with the error ID in the error determination table; and determine that one or more actions should be taken based on the error ID, which includes: computer readable program code configured to locate the error ID in an action table including a plurality of error IDs associated with either no command, one command, or multiple commands to perform in response to the error being detected; and perform the command associated with the error ID. The commands include at least one of: computer readable program code configured to execute a command which caused the error, gather output caused by the execution of the command, and send the gathered output to the host system; and computer readable program code configured to collect log data, and send the log data to the host system. The computer readable code is also configured to send information corresponding to the error to the host system after it is determined that the error should be reported to the host system.

Other aspects and embodiments of the present invention will become apparent from the following detailed description, which, when taken in conjunction with the drawings, illustrate by way of example the principles of the invention.

DETAILED DESCRIPTION

Figure 1:
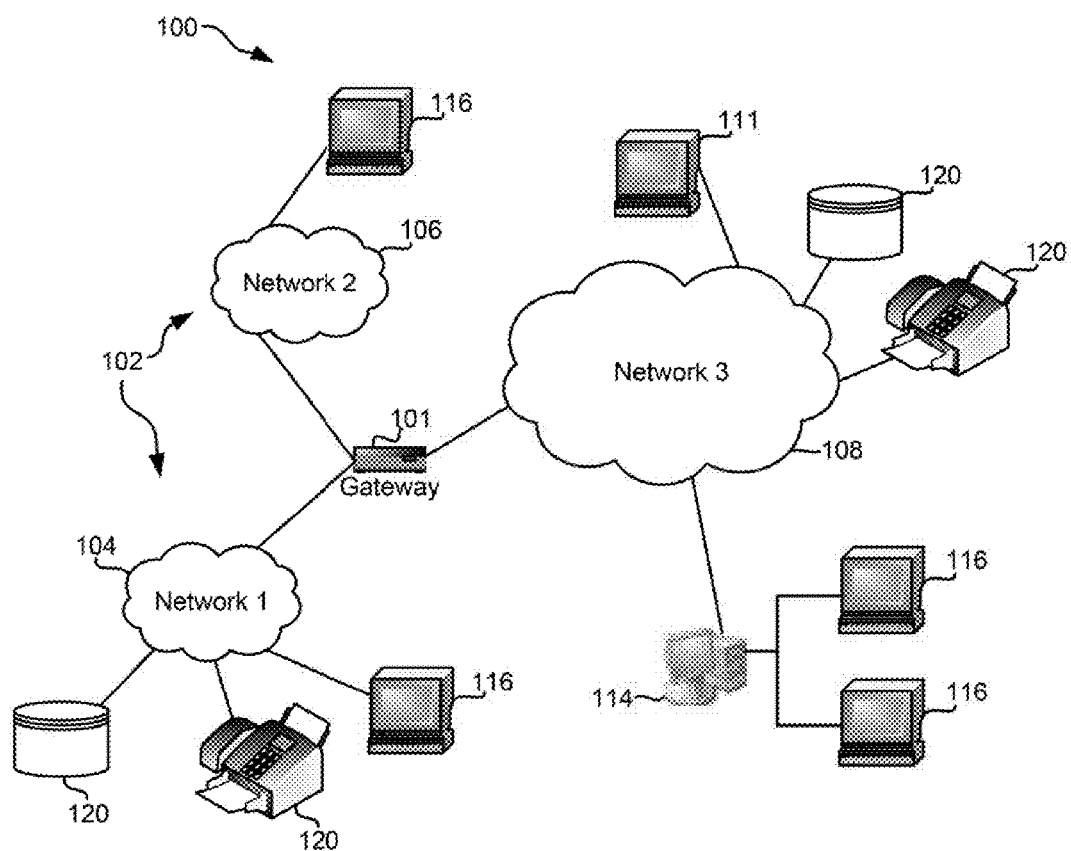
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a method for handling errors includes detecting that an error has occurred in a machine in a system, determining an error ID associated with the error, determining that the error should be reported to a host system for further analysis based on the error ID, determining that one or more actions should be taken by the system based on the error ID, and sending information corresponding to the error to the host system after it is determined that the error should be reported to the host system.

In another general embodiment, a system for handling errors includes a processor, logic for detecting that an error occurred in a machine in a system, logic for determining an error ID associated with the error, logic for determining that the error is a type that is reported to a host system for further analysis based on the error ID, logic for determining that additional actions should be taken by the system based on the error ID, and logic for sending information corresponding to the error to the host system after it is determined that the error is the type that is reported to the host system.

In another general embodiment, a computer program product for handling errors includes a computer readable storage medium having computer readable program code embodied therewith. The computer readable program code includes computer readable program code configured to detect that an error occurred in a machine in a system; determine an error ID associated with the error, wherein each error ID is based on an error code set; and determine that the error should be reported to a host system for further analysis based on the error ID, which includes: computer readable program code configured to locate a command associated with the error ID in an error determination table which includes a plurality of error IDs each associated with either a command to send information corresponding to the error to the host system or a command not to send information corresponding to the error to the host system; follow the command associated with the error ID in the error determination table; and determine that one or more actions should be taken based on the error ID, which includes: computer readable program code configured to locate the error ID in an action table including a plurality of error IDs associated with either no command, one command, or multiple commands to perform in response to the error being detected; and perform the command associated with the error ID. The commands include at least one of: computer readable program code configured to execute a command which caused the error, gather output caused by the execution of the command, and send the gathered output to the host system; and computer readable program code configured to collect log data, and send the log data to the host system. The computer readable code is also configured to send information corresponding to the error to the host system after it is determined that the error should be reported to the host system.

The descriptions included herein make reference to an IBM system called scale out network attached storage (SONAS). However, the systems and methods described herein relating to handling errors may be applied to any system, regardless of manufacturer or configuration, as long as it uses error reporting to a host system. In some embodiments, the host system may be a remote host system, such that one or more technicians/operators may be located at the remote host system and be able to troubleshoot problems that may arise at the system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon:

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
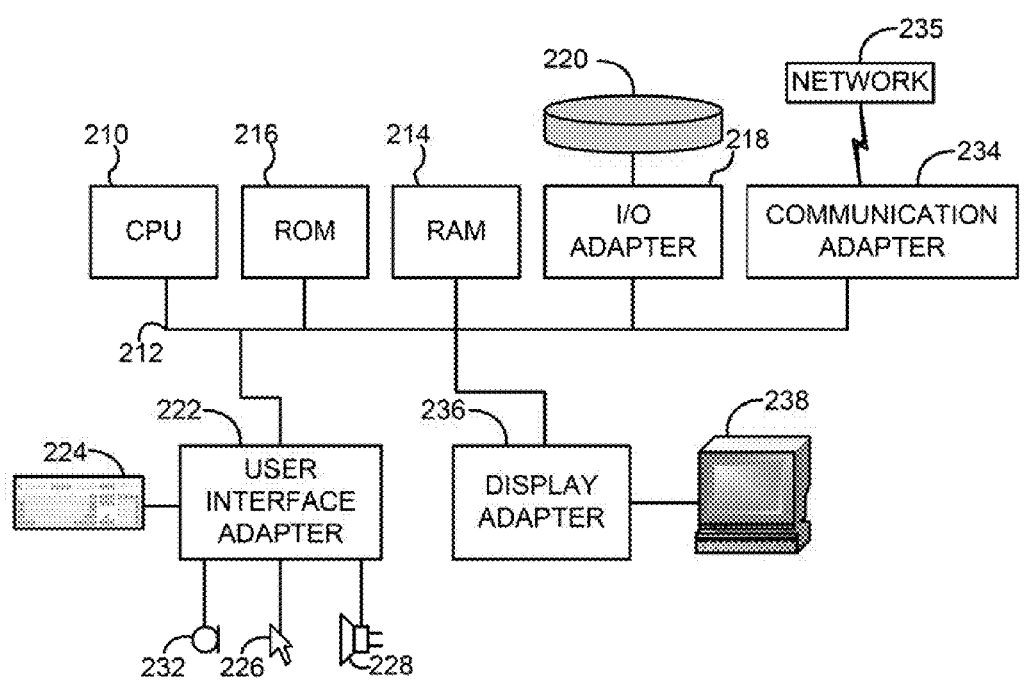
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. This figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

To ensure that a system, which may propagate errors and send errors to a host system for analysis, interpretation, determination, etc., have the ability to adapt to any changes in design which may occur over the lifetime of the system, due at least in part to the scalability of the system, the system may be designed around an error code set that is described specific to the machine in which a specific error is identified, in one embodiment. A system which sends errors to a host system may have a function called "call home" which allows for an error to be sent to a host system. Of course, other functions may also be used to send errors to a host system, and this is just one example of a function that is used in SONAS. For example, a call home system may use the SONAS Error Codes that have been laid out to describe the specific machine that reported the error as well as the specific error that was identified. This design utilizes error determination tables to describe how the error should be handled, and which alert level the error is to be processed with, in one embodiment. Of course, other error codes may be used, as long as they produce errors that are specific to particular machines that produced the error.

In one approach, the process starts by calling the management node's Error Processing Mechanism (EPM) with the error ID that was identified. The EPM looks up the error ID from its register and it uses this configuration file to determine which alert level to continue with. Of course, this description is specific to IBM's SONAS, but any system may be used that has the ability to send errors to a host system. Each system may have a different application which pulls and/or pushes error information from and/or to a host system. Each error ID identifies one alert level (out of a plurality of alert levels) for call home processing. In one embodiment, there may be five alert levels, and the scheme may be as follows.

0—Hardware/microcode Problem record (PB): These types of error IDs trigger a PMR open in RETAIN as well as send data to the Call Home Database for development and service personnel to review, in one approach.

1—Software Problem record (SW): These types of call homes generate a software call home, as well as send data to the Call Home Database, in one approach.

2—Data Call Home (DC): These types of error IDs trigger only a Data Call home to the Call Home Database and do not generate a PMR in RETAIN, in one approach.

3—Logging: These error IDs do not generate a call home or send data to the Call Home Database, but are logged into an informational file which is sent home during the next PB or SW call home, in one approach.

4—Heartbeat (HB): These types of errors are sent as a DC to the Call Home Database only, in one approach. As new methods or processes of error processing arise, the ability to add new identifiers is present, in one approach.

Utilizing a set of error determination tables, which error ID should be sent to the host system (called home) may be determined, along with whether it is still appropriate to call the error home at the time of the processing, in one approach. Of course, other factors may also be taken into consideration, such as how long ago the error ID was initiated, the severity of the error according to the error ID, the importance of the machine which produced the error, etc.

According to various embodiments, the information that may be sent to the host system may include many different items, including, but not limited to: the generated error itself, the error ID, the machine which produced the error, the time/date stamp of the error, what commands occurred prior to the error, what commands occurred after the error, a registry, a log of all commands executed by the system prior to the error, a log of all commands executed by the machine on which the error occurred prior to the error, etc. The information which is sent to the host system, in some embodiments, may be dictated by an action table, according to one embodiment, as is described in more detail later.

Once the system identifies the error, it may invoke the error parsing tool with the error ID. This error ID may be processed through the configuration register and once its alert level has been realized, the error parse program may look and see if the error is eligible to be called home. According to one embodiment, all errors may be called home once in a time period, such as a 12 hour period, a 24 hour period, a 48 hour period, etc. There is no concept of a blackout period for new call home errors, in preferred embodiments. If the designers of the checks have decided that this is a call home instance, then it is reported, regardless of other factors. However, duplicate error IDs are not reported during the time period, in one approach. To ensure this restriction, in one embodiment, an error log register may be created as follows:

ERRORID1=Count, First Occurrence (unix timestamp), Last Occurrence (unix timestamp)

If the error ID shows up in this file and it is past the repeated error blackout time period, the error may be processed as normal. If the error ID is still within the blackout time period, then the counter may be incremented and the processing of the error may be stopped. In this way, it may be logged how many times the error was reported during the time period, but multiple errors will not be called home, so that the interface at the host system is not bombarded by repetitive error calls.

The next step is for the error parsing tool to gather the logs defined by the developer in the Error Log Registry, in one approach. Each error may have an entry in the registry that defines which logs or commands are run for analysis by developers or support personnel. In the instances where an existing log exists, it may be gathered by flagging the log with an "L:", in one embodiment. In the instance of a command and its output, these instances may be flagged with a "C:", in one approach. The Error Log Registry may be defined as follows:

ERRORID1=L:/var/enc/log/*,L:/var/enc/log/messages, C:/usr/vtd/scripts/vtd_check

The error log files may be comma separated, tab delineated, proprietary-formatted, or stored in any other format as would be known to one of skill in the art, and where a command is issued, the output may be directed to a file marked with the command's name. For example, it may be labeled:/usr/vtd/scripts/vtd_check-P will be directed to vtd_check^-P.txt, in one example. Of course, other labeling techniques may be used, such as date/time stamps, machine/time stamp combinations, etc. The file, in one approach, is named such that it can be recognized by an operator for what it is without having to perform elaborate searching to find the files.

Once all of the error parsing has been completed, the call home code may create a call home package in the same fashion as other Enterprise Tape products, in one approach. The nature of this design allows operators (such as reliability, availability, and serviceability (RAS) engineers) to easily modify the rules that are currently being used to determine error severity. As the team of operators learn more about the system and as new features are added, the functionality of the error reporting (such as the call home code) may easily and quickly be updated to facilitate the changing nature of the system, in preferred embodiments.

The files may be put into a queue in order to transmit a batch of errors at predetermined times (or when a certain amount have been accumulated), such as a call home queue, and a component of the system, such as the Electronic Customer Care (ECC) component, may submit the files to a host system. This design may be realized through the use of a Derby database to store the information about the error IDs as well as the systems the process reports for, in one approach. Of course, any type of database as would be known to one of skill in the art may be used. In addition, the system that handles these errors may be programmed in Perl, in one approach, but any programming language may be utilized.

While these languages and tools are ideal for SONAS, other combinations of software and languages may be utilized to fit the needs of the system, in various embodiments.

Figure 3:
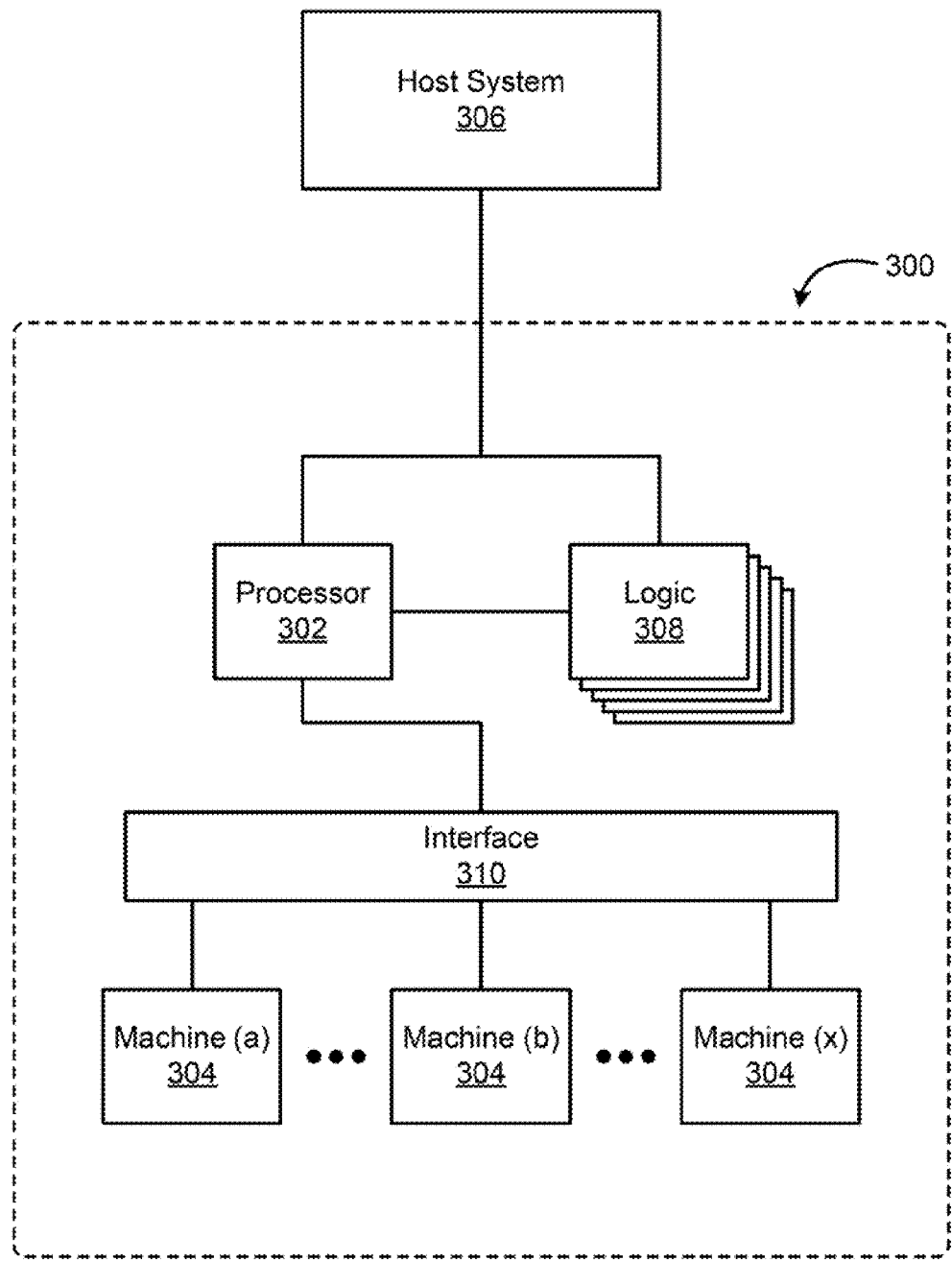
FIG. 3 is a block diagram showing a system for handling errors, according to one embodiment.

Now referring to FIG. 3, a system 300 for handling errors is shown according to one embodiment. The system 300 includes a processor 302, logic 308 for performing various functions, including detecting that an error occurred in a machine 304 (software, hardware, etc.) in the system 300, logic 308 for determining an error ID associated with the error, logic 308 for determining that the error is a type that is reported to a host system 306 for further analysis based On the error ID, logic 308 for determining that additional actions should be taken by the system 300 based on the error ID, and logic 308 for sending information corresponding to the error to the host system 306 after it is determined that the error is the type that is reported to the host system 306.

The machines on which the error occurred may be any device which may produce an error, cause another device to produce an error, result in an error being produced, etc. Exemplary devices include, but are not limited to: computers, workstations, servers, routers, switches, docking stations, peripherals (such as printers, scanners, copiers, monitors, human-interface devices; etc.), power supplies, attenuators, filters, software modules/code, a collection of any of the above described devices, etc.

According to one embodiment, the logic 308 for determining that the error is the type that is reported to the host system may include logic 308 for locating the error ID in an error determination table, and logic 308 for proceeding according to the error determination table. The error determination table may include a plurality of error IDs associated with either a command to send the error to the host system 306 or a command not to send the error to the host system 306, and the plurality of error IDs may be based on an error code set.

In another approach, the logic 308 for determining that the error is the type that is reported to the host system 306 may include logic 308 for not sending information corresponding to the error to the host system 306 if it has already been sent during a preceding time period.

In another approach, the system 300 may include logic for updating the error determination table whenever the system is updated.

In yet another approach, the system 300 may include logic 308 for determining an error alert level at which to process the error. An error having a higher error alert level may be processed before an error having a lower error alert level. In a further approach, multiple error alert levels may exist, including: a first level which is indicative of hardware/microcode problems and triggers a command to send information corresponding to the error to the host system 306, a second level which is indicative of software problems and triggers a command to send information corresponding to the error to the host system 306, a third level which is indicative of a data call home problem and triggers a command to send information corresponding to the error to the host system 306, a fourth level which is indicative of a logging error and does not trigger a command to send information corresponding to the error to the host system 306, and a fifth level which is indicative of a heartbeat error and does not trigger a command to send information corresponding to the error to the host system 366.

According to another embodiment, the system 300 may include logic 308 for calling an error processing mechanism to handle the error, where the error processing mechanism includes logic for looking up the error ID associated with the error in a register to determine an associated configuration file with which to process the error, and logic 308 for processing the error according to the associated configuration file.

In yet another embodiment, the logic 308 for determining that additional actions should be taken by the system 300 may include logic 308 for locating the error ID in an action table, and logic 308 for proceeding according to the action listed in the action table which corresponds with the error ID. The action table may include a plurality of error IDs associated with either no command, one command, or multiple commands for the system 300 to perform in response to the error being detected.

In this embodiment, one of the commands may include collecting log data and sending the log data to the host system. In another embodiment, one of the commands may include executing a command which caused the error, gathering output caused by the execution of the command, and sending the gathered output to the host system.

In a further embodiment, the system 300 may include logic 308 for updating the action table. In this embodiment, the action table may be updated whenever one of the following events occurs: changes to the system, periodic review of the action table, code load upgrade, and manual intervention to the action table.

In one example, and not limiting in any way, an action table appear as shown in Table 1, below. Of course, many different approaches may be taken to arrive at an action table, and Table 1 is an example only, and is specifically applicable to a SONAS system implementation. However, similar commands and/or actions may be implemented in other systems.

TABLE 1

| Example of an Action Table | | |
|---|---|---|
| Name | Data Type | Description |
| AID | INT | Generated sequential identifier |
| ACTION | CHAR(1) | Action to be taken. Possible values include:<br>L - Collect log data.<br>C - Run a specified command causing the error.<br>Q - Query that will not be run as part of the normal call home process but if cndump is run with a -Q, then this will be run.<br>X - Extra big file (e.g., a core file) will not be collected through the call home process, but if cndump is run with -X, then this will be run. |
| LOG_COLLECTION_QUALIFIER | CHAR(1) | Indicates whether this is a single collected log or a range based on time, possible values include:<br>S - Single log<br>R - Range of logs |
| MANAGEMENT_NODE | CHAR(1) | Action to be taken on the management node(s). Possible values include:<br>H - Collect heartbeat data<br>N - Do not collect heartbeat data or run command(s)<br>S - Collect data from the node where the error surfaced or run command(s)<br>A - Collect data from all nodes or run command(s)<br>C - Collect call home data from all nodes |
| INTERFACE_NODE | CHAR(1) | Action to be taken on the interface node(s). Possible values include:<br>H - Collect heartbeat data<br>N - Do not collect heartbeat data or run command(s)<br>S - Collect data from the node where the error surfaced or run command(s)<br>A - Collect data from all nodes or run command(s)<br>C - Collect call home data from all nodes |
| STORAGE_NODE | CHAR(1) | Action to be taken on the management node(s). Possible values include:<br>H - Collect heartbeat data<br>N - Do not collect heartbeat data or run command(s) |

TABLE 1-continued

Example of an Action Table

| Name | Data Type | Description |
| --- | --- | --- |
| | | S - Collect data from the node where the error surfaced or run command(s)<br>A - Collect data from all nodes or run command(s)<br>C - Collect call home data from all nodes |
| NEED_CURRENT_NUMBER | INT | Total number of most current log files to gather, defaults to 0 to indicate gathering of the most current. |
| NEED_MINIMUM_NUMBER | INT | Always gather at least this number of files. |
| TIME_MATCH_NEEDED | CHAR(1) | Gather files based on time error was encountered. Possible values include:<br>Y - Gather based on time.<br>N - Gather the current number. |

To more fully understand the commands presented in Table 1, some description of a SONAS based system is included below. Of course, this is exemplary information only, and is not limiting in any way. The action table may create an input file for a command in a SONAS system called endump, which is a utility that operates as a management node tool that starts and controls the running of the engetlogs tool across a cluster. The engetlogs tool collects log data. In one embodiment, the endump call may be arranged as follows:

endump [-B identifier_of_bad_node][-C|-H][-l insfruction_file_name|-S [tar_ball_file_name]][-h|-u|-v]

Note: -B is optional. Null collects data from all nodes. B collects data from the management node and the bad node. C and H are optional and mutually exclusive. Null collects all available data. l and S are optional and mutually exclusive. Null collects data in the default file. h, u, and v are optional and mutually exclusive. Null causes the tar ball to remain on the node.

Now a discussion of the parameters of the endump call. -? prints help text. For example, issuing endump -? provides a list of the actions available with the endump command. -B identifier_of_bad_node collects extended information for the management node and the bad node. The identifier_of_bad_node identifies the node suspected of having the problem. -C collects call home type data. Contrast this parameter to the -h parameter that issues a call home call and transmits the tar ball. -H generates a heartbeat call, which affects the scope of the information that is collected. -l instruction_file_name identifies a file that contains a list of collection instructions that specify what data to collect. In the future, the list of collection instructions may be available in the database, but for now a default file provides the collection instructions when the parameter is not specified. -S tar_ball_file_name sends a tar ball file. The tar ball file name is optional. Additionally, if a file name is not specified, the utility may list available files in the filesystem that can be sent. -h generates a call home call to transmit the tar ball or data that is collected. Contrast this parameter to the -C parameter that controls what type of data is collected. -u writes the tar ball to a USB memory key. -v writes the tar ball to an optical disk. -p provider gathers the data for a specific provider. -e error_code gathers the data for a specific error code.

In one embodiment, when run from the management node, the endump utility collects data for analysis of a problem in an IBM SONAS system. The endump utility packages all configuration files from every cluster that the utility can access through the management Ethernet network, copies all of the data and logs to the management node, and makes a single, very large tar ball (tar-gzip) compressed file. The tar ball is stored in a unique filesystem on its own logical hard disk (hdisk) on the management node. The name of the filesystem is /ftdc.

Any data and trace files that are put into the /persist/pfe directory on any node that is being collected are included in the files that the endump utility packages. A directory may be created on the node to store the data. Which files are in the directory and the deletion of old files from the directory when there is no intention to collect the files is up to the user. The endump utility includes whatever files are in the /persist/pfe directory without regard to their date, size, or other characteristics.

According to some embodiments, some valid invocation examples include:

endump (Collects data from every available cluster into a tar-gunzip file on the management node.)

endump -Ch (Collects call home data and sends it to a call home destination.)

endump -B (Collects data for the bad node and keeps it on the system.)

endump -u (Collects all data and puts it on a USB memory stick.)

When run from the command line, the endump utility logs collection events to the screen. If logs are being collected, then the nodes from which the endump utility is collecting data may be seen. A sample file name may be: /ftdc/sonasl gml_20100120_181452.tar.gz. The format for the tarball gunzip may be: machine_name_YYYYMMDD_HHMMSS.tar.gz. The /ftdc filesystem is reserved for IBM authorized servicer providers on its own hard disk on the management node.

A process for unpacking the tar ball is as follows, in one approach:

Gunzip the file. Extract the tar file to create a directory of the form: machine_name_YYYYMMDD_HHMMSS with node directories that each have two log files per node and additional files. Unpack the tar-gzip file for each node to see the collected data files, some of which include: var/log/messages.sml (contains the last 15,000 lines of messages); var/log/messages_more.tar.gz (contains the /var/log/messages*tiles); var/log/samba_dir.tar.gz (contains the contents of /var/log/samba); var/log/enlog_dir.tar.gz (contains the contents of /var/log/enlog); and var/log/sonas_dir.tar.gz (contains the contents of the most recent data capture subdirectory).

Some considerations to this process are as follows. The files are generally quite big, which is why they are compressed at every level. For example, data from a single node can exceed 1 GB. Unpack files from the desired nodes. The endump utility runs as multiple background jobs, one per node, on the management node (where endump is run), with each job running until it finishes or dies. If the ctdb status shows a BANNED, STOPPED or not a Recovery: Normal node, ctdb diagnostics and net conf list do not run. Also, the endump utility does not handle hangs other than skipping ctdb diagnostics and net conf list. Unfortunately, the wait for completion varies per node. As experience with the tool increases, better judgement may be used as to when a hang might have occurred versus a normal wait for the data-collection run time.

Figure 4:
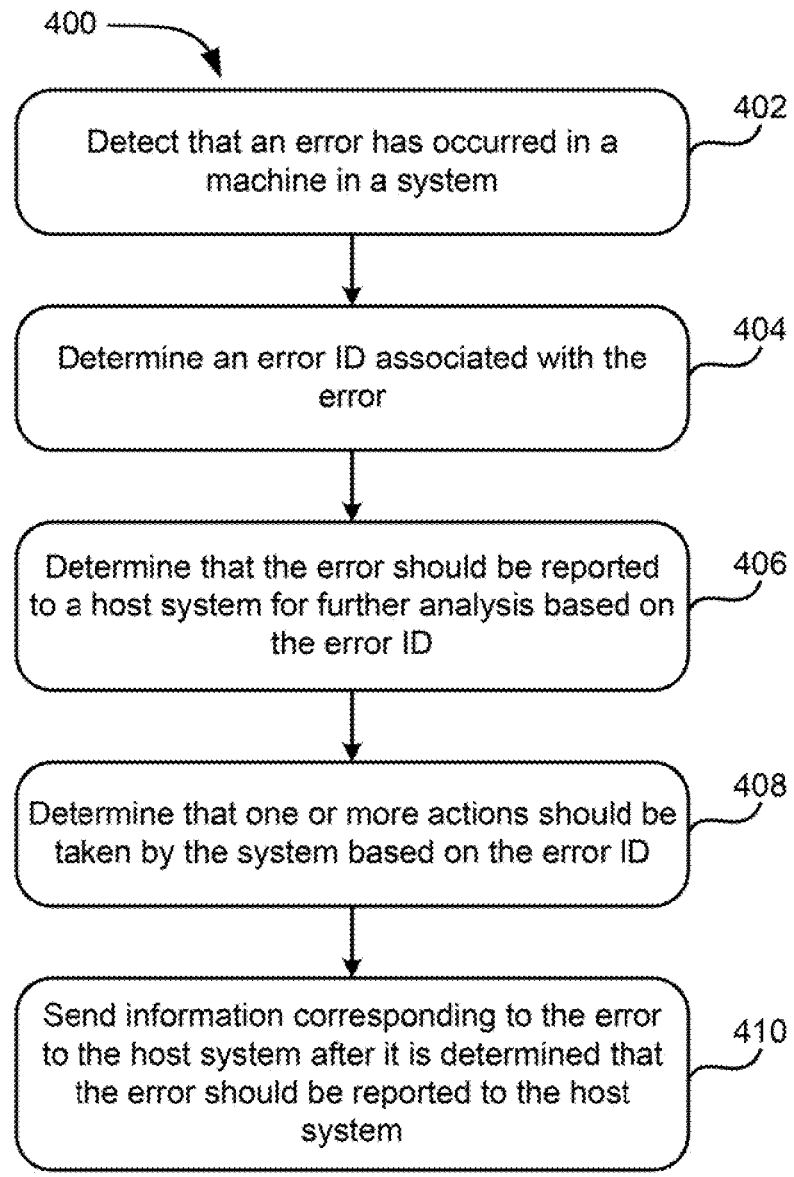
FIG. 4 is a flowchart of a method for handling errors, in one embodiment.

Now referring to FIG. 4, a method 400 for handling errors is described according to one embodiment. The method 400 may be executed in any desired environment, including those described in FIGS. 1-3, along with other environments as would be known to one of skill in the art. Additional operations not shown in FIG. 4 may be included in the method 400, and the operations may be performed in any order.

In operation 402, it is detected that an error has occurred in a machine in a system. If no error has occurred in the system, then method 400 is not utilized, according to preferred embodiments. The machine on which the error occurred may be any device which may produce an error, cause another device to produce an error, result in an error being produced, etc. Exemplary devices include, but are not limited to: computers, workstations, servers, routers, switches, docking stations, peripherals (such as printers, scanners, copiers, monitors, human-interface devices, etc.), power supplies, attenuators, filters, software modules/code, etc. The system may include a massive plurality of machines which may, either directly or indirectly, cause an error to be detected by the system, or an application or other system designed to detect errors.

In one embodiment, an error processing mechanism may be called to handle the error. In one approach, the error processing mechanism may look up the error ID associated with the error in a register to determine an associated configuration file with which to process the error.

In operation 404, an error ID associated with the error is determined. Any method of determining the error ID may be used, such as using a lookup table, searching a file particular to the machine on which the error occurred, etc. In preferred embodiments, the error ID is presented to the system when the error occurs, such as by programming a set of error codes to produce recognizable error IDs. The error ID preferably is part of a predetermined error code set, such as a SONAS Error Code Set, among many alternatives.

In operation 406, it is determined that the error should be reported to a host system for further analysis based on the error ID. Of course, in some embodiments, the error ID may indicate that the error should not be reported to the host system, in which case it is not reported. Any method may be used to determine that the error should be reported, and in one preferred embodiment, an error determination table may be used.

In this embodiment, the error ID is located in an error determination, table and the system proceeds according to the entry in the error determination table which corresponds to the error ID. According to one embodiment, the error determination table may include a plurality of error IDs associated with either a command to send information corresponding to the error to the host system or a command not to send information corresponding to the error to the host system. Of course, other embodiments of the error determination table are possible, such as a register file, a log, a configuration file, etc., which directs the system how to proceed based on the error ID.

In another embodiment, information about the error is not sent to the host system if it has already been sent during a preceding time period. For example, if the error has already been reported to the host system, and even though it is determined that the error is the type reported to the host system, it may not be reported in a predetermined time period, such as 6 hours, 12 hours, 24 hours, 48 hours, etc.

In another embodiment, the error determination table may be updated whenever the system is updated. This ensures that the error determination table includes instructions that are relevant to the current system configuration. Of course, even if the system is updated (e.g., hardware and/or software changes), the error determination table may not change, but it may be reviewed to ensure that no changes are dictated by the changes to the system.

In some embodiments, an error alert level at which to process the error may be determined. An error having a higher error alert level may be processed before an error having a lower error alert level. In this way, more important errors, those which can indicate a serious problem in the system, may be handled and reported before any other less important errors.

In one embodiment, multiple error alert levels may exist, including: a first level which is indicative of hardware/microcode problems and triggers a command to send information corresponding to the error to the host system, a second level which is indicative of software problems and triggers a command to send information corresponding to the error to the host system, a third level which is indicative of a data call home problem and triggers a command to send information corresponding to the error to the host system, a fourth level which is indicative of a logging error and does not trigger a command to send information corresponding to the error to the host system, and a fifth level which is indicative of a heartbeat error and does not trigger a command to send information corresponding to the error to the host system.

In operation 408, it is determined that one or more actions should be taken by the system based on the error ID. Of course, in some embodiments, no further actions are directed to be taken, and in which case the system will take no further action. In one preferred embodiment, the decision of whether to take additional actions may be determined using an action table.

In this embodiment, the error ID may be located in an action table and the system may proceed according to the action listed in the action table which corresponds with the error ID. The action table, in one embodiment, may include a plurality of error IDs associated with either no command, one command, or multiple commands for the system to perform in response to the error being detected.

In this approach, according to one embodiment, one of the commands may include collecting log data and sending the log data to the host system. In another approach, one of the commands may include executing a command which caused the error, gathering output caused by the execution of the command, and sending the gathered output to the host system. Of course, many other commands are available as well, such as those described previously in regard to Table 1.

In a further approach, additional information may be collected corresponding to the error and this information, and possibly the error itself, may be sent to the host system. Of course, as discussed previously, additional information corresponding to the error may be sent to the host system.

In another embodiment, the action table may be updated. In this embodiment, the action table may be updated when an event occurs, periodically, manually, etc. For example, the action table may be updated whenever one of the following events occurs: changes to the system, periodic review of the action table, code load upgrade, and manual intervention to the action table. This ensures that the action table includes instructions that are relevant to the current system configuration. Of course, even if the system is updated (e.g., hardware and/or software changes), the action table may not change, but it may be reviewed to ensure that no changes are dictated by the changes to the system.

In operation 410, information corresponding to the error is sent to the host system after it is determined that the error should be reported to the host system. Any method of sending the information to the host system may be used as would be known to one of skill in the art.

According to another embodiment, a computer program product for handling errors may include some or all of the functionality described regarding the method 400. For example, in one embodiment, the computer program product may include a computer readable storage medium having computer readable program code embodied therewith. The computer readable program code may include computer readable program code configured to detect that an error occurred in a machine in a system, computer readable program code configured to determine an error ID associated with the error, wherein each error ID is based on an error code set, computer readable program code configured to determine an error alert level at which to process the error, wherein an error having a higher error alert level is processed before an error having a lower error alert level, computer readable program code configured to determine that the error should be reported to a host system for further analysis based on the error ID, comprising: computer readable program code configured to generate an error determination table which includes a plurality of error IDs each associated with either a command to send information corresponding to the error to the host system or a command not to send information corresponding to the error to the host system, computer readable program code configured to locate the error ID and a corresponding command in the error determination table, computer readable program code configured to follow the command in the error determination table, and computer readable program code configured to not send information corresponding to the error to the host system if it has already been sent during a preceding time period.

The product may also include computer readable program code configured to determine that one or more actions should be taken based on the error ID, comprising: computer readable program code configured to generate an action table including a plurality of error IDs associated with either no command, one command, or multiple commands to perform in response to the error being detected, and computer readable program code configured to locate the error ID in the action table and perform a command associated with the error ID. Also, the product may include computer readable program code configured to send information corresponding to the error to the host system after it is determined that the error should be reported to the host system.

In another embodiment, a computer program product for handling errors includes a computer readable storage medium having computer readable program code embodied therewith. The computer readable program code includes computer readable program code configured to detect that an error occurred in a machine in a system; determine an error ID associated with the error, wherein each error ID is based on an error code set; and determine that the error should be reported to a host system for further analysis based on the error ID, which includes: computer readable program code configured to locate a command associated with the error ID in an error determination table which includes a plurality of error IDs each associated with either a command to send information corresponding to the error to the host system or a command not to send information corresponding to the error to the host system; follow the command associated with the error ID in the error determination table; and determine that one or more actions should be taken based on the error ID, which includes: computer readable program code configured to locate the error ID in an action table including a plurality of error IDs associated with either no command, one command, or multiple commands to perform in response to the error being detected; and perform the command associated with the error ID. The commands include at least one of: computer readable program code configured to execute a command which caused the error, gather output caused by the execution of the command, and send the gathered output to the host system; and computer readable program code configured to collect log data, and send the log data to the host system. The computer readable code is also configured to send information corresponding to the error to the host system after it is determined that the error should be reported to the host system.

In this or any other embodiment, the computer program product may further include computer readable program code configured to update the action table. Additionally, in some embodiments, the action table may be updated whenever one of the following events occurs: changes to the system, periodic review of the action table, code load upgrade, and manual intervention to the action table.

Of course, other implementations of computer program products are possible, especially in light of the descriptions included herein, along with what one of skill in the art would know.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for handling errors, comprising:
   detecting that an error has occurred in a machine in a system;
   determining an error ID associated with the error;
   determining whether or not the error should be reported to a host system for further analysis based on the error ID;
   determining that one or more actions should be taken by the system based on the error ID; and
   sending information corresponding to the error to the host system after it is determined that the error should be reported to the host system.

2. The method as recited in claim 1, wherein determining that one or more actions should be taken by the system comprises;
   locating the error ID in an action table; and
   proceeding according to one or more actions listed in the action table which correspond with the error ID,
   wherein the action table includes a plurality of error IDs associated with either no command, one command, or multiple commands for the system to perform in response to the error being detected.

3. The method as recited in claim 2, wherein determining that one or more actions should be taken by the system based on the error ID further comprises collecting additional information corresponding to the error from the machine on which the error occurred and sending the additional information to the host system.

4. The method as recited in claim 2, wherein one of the commands includes collecting log data from the machine on which the error occurred and sending the log data to the host system.

5. The method as recited in claim 2, wherein one of the commands includes:
   executing a command which caused the error;
   gathering output caused by the execution of the command; and
   sending the gathered output to the host system.

6. The method as recited in claim 2, further comprising updating the action table whenever one of the following events occurs; changes to the system, periodic review of the action table, code load upgrade, and manual intervention to the action table.

7. The method as recited in claim 1, wherein determining the error ID associated with the error comprises looking up the error ID from a register of the machine on which the error occurred.

8. The method as recited in claim 1, wherein determining that the error should be reported to the host system comprises not sending the error to the host system if it has already been sent during a preceding time period, and
   wherein determining that one or more actions should be taken by the system comprises:
      locating the error ID in an action table;
      proceeding according to the action listed in the action table which corresponds with the error ID, the action table comprising a plurality of error IDs associated with either no command, one command, or multiple commands for the system to perform in response to the error being detected; and
      collecting additional information corresponding to the error and sending the additional information to the host system.

9. The method as recited in claim 1, wherein, determining that the error should be reported to the host system comprises locating the error ID in an error determination table specific to machines in the system and proceeding according to the error determination table, wherein the error determination table includes a plurality of error IDs associated with either a command to send information corresponding, to the error to the host system or a command not to send information corresponding to the error to the host system, wherein the plurality of error IDs are based on an error code set.

10. A system for handling errors, comprising:
    a hardware processor;
    logic for detecting that an error occurred in a machine in a system;
    logic for determining an error ID associated with the error by looking up the error ID from a register of the machine on which the error occurred;
    logic for determining whether or not the error is a type that is reported to a host system for further analysis based on the error ID;
    logic for determining that additional actions should be taken by the system based on the error ID; and
    logic for sending information corresponding to the error to the host system after it is determined that the error is the type that is reported to the host system.

11. The system as recited in claim 10, wherein the logic for determining that the error is the type that is reported to the host system comprises:
    logic for locating the error ID in an error determination table specific to machines in the system; and
    logic for proceeding according, to the error determination table,
    wherein the error determination table includes a plurality of error IDs associated with either a command to send the error to the host system or a command not to send the error to the host system,
    wherein the plurality of error IDs are based on an error code set.

12. The system as recited in claim 10, wherein the logic for determining that additional actions should be taken by the system comprises:
    logic for locating the error ID in an action table; and
    logic for proceeding according to one or more actions listed in the action table which correspond with the error ID, wherein the action table includes a plurality of error IDs associated with either no command, one command, or multiple commands for the system to perform in response to the error being detected.

13. The system as recited in claim 12, wherein one of the commands includes collecting log data from the machine on which the error occurred and sending the log data to the host system.

14. The system as recited in claim 12, wherein one of the commands includes:
    executing a command which caused the error;
    gathering output caused by the execution of the command; and
    sending the gathered output to the host system.

15. The system as recited in claim 12, further comprising logic for updating the action table whenever one of the following events occurs: changes to the system, periodic review of the action table, code load upgrade, and manual intervention to the action table.

16. The system as recited in claim 10, wherein the logic for determining the error ID associated with the error comprises looking up the error ID from a register of the machine on which the error occurred.

17. The system as recited in claim 10, wherein the logic for determining that the error is the type that is reported to the host system comprises logic for not sending information corresponding to the error to the host system if it has already been sent during a preceding time period.

18. A computer program product for handling errors, the computer program product comprising:
    a non-transitory computer readable storage medium having, computer readable program code embodied therewith, the computer readable program code comprising:
       computer readable program code configured to detect that an error occurred in a machine in a system;
       computer readable program code configured to determine an error ID associated with the error, wherein each error ID is based on an error code set;
       computer readable program code configured to determine that whether or not the error should be reported to a host system for further analysis based on the error ID,
    comprising:
       computer readable program code configured to locate a command associated with the error ID in an error determination table which includes a plurality of error IDs each associated with either a command to send information corresponding to the error to the host system or a command not to send information corresponding to the error to the host system;

computer readable program code configured to follow the command associated with the error ID in the error determination table;

computer readable program code configured to determine that one or more actions should be taken based on the error ID, comprising;

computer readable program code configured to locate the error ID in an action table including a plurality of error IDs associated with either no command, one command, or multiple commands to perform in response to the error being detected;

computer readable program code configured to perform the command associated with the error ID, wherein the commands include at least one of:

computer readable program code configured to execute a command which caused the error, gather output caused by the execution of the command, and send the gathered output to the host system; and computer readable program code configured to collect log data, and send the log data to the host system; and computer readable program code configured to send information corresponding to the error to the host system after it is determined that the error should be reported to the host system.

19. The computer program product as recited in claim 18, further comprising computer readable program code configured to update the action table whenever one of the following events occurs: chances to the system, periodic review of the action table, code load upgrade, and manual intervention to the action table.

20. The computer program product as recited in claim 19, wherein the computer readable program code configured to determine the error ID associated with the error comprises looking up the error ID from a register of a machine on which the error occurred.

* * * * *